United States Patent
Yoshizawa et al.

(10) Patent No.: US 11,204,243 B2
(45) Date of Patent: Dec. 21, 2021

(54) POINT CLOUD DATA EXTRACTION METHOD AND POINT CLOUD DATA EXTRACTION DEVICE

(71) Applicants: RIKEN, Wako (JP); TOPCON CORPORATION, Tokyo (JP)

(72) Inventors: Shin Yoshizawa, Wako (JP); Hideo Yokota, Wako (JP); Suguru Miyagawa, Tokyo (JP)

(73) Assignees: TOPCON CORPORATION, Tokyo (JP); RIKEN, Wako (JP)

( * ) Notice: Subject to any disclaimer, the term of this patent is extended or adjusted under 35 U.S.C. 154(b) by 165 days.

(21) Appl. No.: 16/461,160

(22) PCT Filed: Feb. 28, 2018

(86) PCT No.: PCT/JP2018/007545
§ 371 (c)(1),
(2) Date: May 15, 2019

(87) PCT Pub. No.: WO2018/159690
PCT Pub. Date: Sep. 7, 2018

(65) Prior Publication Data
US 2019/0285410 A1    Sep. 19, 2019

(30) Foreign Application Priority Data

Feb. 28, 2017    (JP) .............................. JP2017-037620

(51) Int. Cl.
*G01B 21/30*    (2006.01)
*G01B 11/30*    (2006.01)
(Continued)

(52) U.S. Cl.
CPC ............ *G01B 21/30* (2013.01); *G01B 11/303* (2013.01); *G01B 21/00* (2013.01); *G01C 7/04* (2013.01)

(58) Field of Classification Search
CPC ...... G01B 21/30; G01B 21/00; G01B 11/303; G01C 7/04; G06T 2207/10016;
(Continued)

(56) References Cited

U.S. PATENT DOCUMENTS 6,081,230 A  *  6/2000  Hoshino ............... G01C 21/165
                                                   342/357.32
7,062,352 B2 *  6/2006  Hasebe ............... G05B 19/4068
                                                         700/180
(Continued)

FOREIGN PATENT DOCUMENTS

JP    H10288516 A     10/1998
JP    3205799 B2 *    9/2001  ............ G01C 21/00
(Continued)

OTHER PUBLICATIONS

Min Mun, Personal Data Vaults: A Locus of Control for Personal Data Streams, 2010, 12 pages (Year: 2010).*
(Continued)

*Primary Examiner* — Tung S Lau
(74) *Attorney, Agent, or Firm* — Chiesa Shahinian & Giantomasi PC

(57)    ABSTRACT

Target point cloud data about a specific road are extracted from perimeter point cloud data acquired by moving a road surface measurement device along a measurement route and scanning the surroundings thereof. A data storage unit stores trajectory point sequence data that represent, as a plurality of (Continued)

trajectory points, the perimeter point cloud data and a trajectory of the movement of the road surface measurement device. A trajectory point sequence setting unit acquires a trajectory point sequence at equal intervals from the trajectory point sequence data. An extraction area setting unit sets, as extraction areas, a column area Ci and a parallelepiped area Hi that are geometric areas disposed at predetermined positions below a trajectory point Xi. An approximate nearest neighbor search processing unit and an extraction processing unit extract, as the target point cloud data, point data that belong to this extraction area of the perimeter point cloud data.

6 Claims, 6 Drawing Sheets

(51) Int. Cl.
  *G01C 7/04* (2006.01)
  *G01B 21/00* (2006.01)
(58) Field of Classification Search
  CPC . G06T 2207/10028; G06T 2207/30256; G06T 7/11; G06T 7/174
  See application file for complete search history.

(56) References Cited

U.S. PATENT DOCUMENTS

| | | | |
|---|---|---|---|
| 8,825,391 B1 | | 9/2014 | Urmson et al. |
| 9,182,235 B2 * | | 11/2015 | Hara .................... G01C 21/005 |
| 2014/0088863 A1 * | | 3/2014 | Hara ...................... G01C 21/30 |
| | | | 701/445 |

FOREIGN PATENT DOCUMENTS

| | | | | | |
|---|---|---|---|---|---|
| JP | 201432444 | A | | 2/2014 | |
| JP | 2014163707 | A | | 9/2014 | |
| JP | 6487283 | B2 | * | 3/2019 | ............. G01C 7/02 |
| KR | 10-1996623 | B1 | * | 7/2019 | ............. G06T 17/05 |
| KR | 2019-0088866 | A | * | 7/2019 | ............. G01C 21/32 |
| WO | 2013129580 | A1 | | 7/2015 | |
| WO | WO 2016185659 | | * | 11/2016 | ............. G01C 21/16 |
| WO | WO 2017/154061 | A1 | * | 9/2017 | ............. G01B 11/24 |

OTHER PUBLICATIONS

Guan et al., "Automated Road Information Extraction From Mobile Laser Scanning Data," IEEE Transactions on Intelligent Transportation Systems, vol. 16, No. 1, Feb. 2015, pp. 194-205.
International Search Report and Written Opinion dated Apr. 17, 2018, in connection with International Patent Application No. JP/2018/007545, 8 pgs.

* cited by examiner

POINT CLOUD DATA EXTRACTION METHOD AND POINT CLOUD DATA EXTRACTION DEVICE

CROSS-REFERENCE TO RELATED APPLICATIONS

This application is a national stage (under 35 U.S.C. 371) of International Patent Application No. PCT/JP2018/007545, filed Feb. 28, 2018, which claims priority to Japanese Patent Application No. 2017-037620, filed Feb. 28, 2017, both of which are herein incorporated by reference in their entirety.

TECHNICAL FIELD

The present invention relates to methods and devices which extract point cloud data of a road or the like as an analysis target from point cloud data across the entire perimeter of a measurement device measured by the measurement device.

BACKGROUND ART

In general, roads have ruts and asperities occurring with time due to passage of vehicles and so forth, and require repairment to correct these. To make these repairs on a road, a road inspection is performed, and data as to road surface properties of the road, that is, data as to the state of asperities of the road surface, is acquired. The data as to these road surface properties is acquired by measurements by measurement staff or by a road surface property vehicle travelling along a measurement route of a road as a measurement target. On the road surface property vehicle, a measurement device is mounted which applies scanning light onto a road surface to measure the height of each point on the road surface.

Described in Patent Literature 1 is a technique as follows. In a device which moves a movable body to a longitudinal direction of a plane and casts light toward the plane to measure a level difference on the plane based on the light-casting result, the device is configured to include means which detects a moving distance, light-casting means, means which images a light-applying line, traverse-direction data computation means which acquires height data, longitudinal-direction data computation means, and three-dimensional data computation means. With the above-described structure, light is cast from the mobile body toward the plane so that one applying line is formed on the plane along the traverse direction of the plane every time the movable body moves at a predetermined distance, and a profile of asperities is acquired on a real-time basis by the various means described above.

In this road surface property vehicle, a measurement of the height of the road surface is carried out by spirally applying scanning light diagonally forward of the vehicle by a scanner of the measurement device while acquiring a position by GNSS (Global Navigation Satellite System) to receive reflected light from a peripheral architecture.

Here, the measurement device includes a plurality of, for example, thirty-two, measurement elements, drives and rotates these measurement elements to sequentially perform scanning, and acquires a distance to the peripheral structure to acquire point cloud data over the entire perimeter.

In general, when the properties of a road are investigated, those other than the structure desired to be as an analysis target such as an inner wall and maintenance slope of the road and a tunnel are also acquired in the acquired point cloud. Thus, to analyze the properties of the road, it is required to cut out only a point cloud of a structure portion such as the road as an analysis target from this point cloud data. In conventional point cloud processing software, a person can cut out point cloud data by determining a range. However, to acquire point cloud data, it is required to manually designate an area desired to be acquired. Thus, manually extracting analysis-target point cloud data from point cloud data is troublesome. Therefore, it is desired to automatically acquire point cloud data as to a road.

Suggested in Non-Patent Literature 1 is a method of recognizing the shape of asperities on a road shoulder of a road as a measurement target and automatically distinguishing a road portion.

CITATION LIST

Non-Patent Literature

H. Guan et al. "Automated Road Information Extraction From Mobile Laser Scanning Data" IEEE TITS 16(1): 194 205, 2015

Patent Literature

PTL 1: Japanese Unexamined Patent Application Publication No. 10-288516

SUMMARY OF INVENTION

Technical Problem

However, in the conventional point cloud data extraction method suggested in Non-Patent Literature 1, there are problems in which the process is complex and also it is difficult to address a case in which a target such as a curb is not present on a road shoulder.

The present invention was developed to solve the conventional problems, and has an object of providing a point cloud data extraction method and device capable of easily and automatically extracting analysis-target point cloud data as to a structure as an analysis target from point cloud data as to a measurement route acquired over the entire perimeter of a measurement device.

Solution to Problem

The invention described in claim 1 to solve the above-described problems is directed to a point cloud data extraction method of extracting target point cloud data as point cloud data as to a specific analysis target from entire perimeter point cloud data acquired by moving a measurement device along a measurement route and scanning a perimeter of the measurement device, the method including: acquiring locus point string data representing a locus of movement of the measurement device on the measurement route as a plurality of locus points; setting, as an extraction area, an area positionally defined with reference to each of the locus points of a locus point string acquired from the locus point string data and specified by a designated geometrical shape; and extracting, as target point cloud data, point data in the entire perimeter point cloud data belonging to the extraction area.

The invention described in claim 2 likewise is directed to the point cloud data extraction method described in claim 1 in which the locus point string is acquired by acquiring locus points spaced at a constant distance designated from measurement locus point string data acquired at constant time intervals defined in advance.

The invention described in claim 3 likewise is directed to the point cloud data extraction method described in claim 1 in which the measurement route is a traveling route on a road as a measurement target, the analysis target is a road surface of the road, and the extraction area is a plurality of columnar areas set at positions defined in advance on a vertical line from the locus points and the columnar areas each have set thereto a diameter set in advance and a height dimension set in advance.

The invention described in claim 4 likewise is directed to the point cloud data extraction method described in claim 2 in which the extraction area includes a plurality of said columnar areas, and an inner area of a parallelepiped area surrounded by, when attention is focused on adjacent two said columnar areas, two parallel tangent planes circumscribing an outer circumferential plane of each of the two columnar areas, an upper plane corresponding to upper planes of the two columnar areas, a bottom plane corresponding to bottom planes of the two columnar areas, and diameter planes including two generatrixes where the two tangent planes are in contact with the outer circumferential plane in each of the two columnar areas and forming diameters of the columnar areas.

The invention described in claim 5 likewise is directed to the point cloud data extraction method described in claim 1 in which a determination as to whether the entire perimeter point cloud data belongs to the extraction area is made by Approximate Nearest Neighbor (ANN) and a determination as to inside or outside of a region specified by a designated geometrical shape.

The invention described in claim 6 likewise is directed to a point cloud data extraction device of extracting target point cloud data as point cloud data as to a specific analysis target from entire perimeter point cloud data acquired by moving a measurement device along a measurement route and scanning a perimeter of the measurement device, the point cloud data extraction device including: means which acquires locus point string data representing a locus of movement of the measurement device on the measurement route as a plurality of locus points; means which sets, as an extraction area, an area positionally defined with reference to each of the locus points and specified by a designated geometrical shape; and means which extracts, as target point cloud data, point data in the entire perimeter point cloud data belonging to the extraction area.

Advantageous Effects of Invention

According to the point cloud data extraction method in accordance with the present invention, it is possible to easily and automatically extract analysis-target point cloud data as to a structure as an analysis target from the point cloud data as to the measurement route acquired over the entire perimeter of the measurement device.

That is, according to the point cloud data extraction method described in claim 1 and the point cloud data extraction device described in claim 6, when target point cloud data as point cloud data as to a specific analysis target from the entire perimeter point cloud data acquired by moving the measurement device along the measurement route and scanning the perimeter of the measurement device, locus point string data is acquired representing a locus of movement of the measurement device on the measurement route a plurality of locus points, an area positionally defined with reference to each of the locus points of a locus point string and specified by a designated geometrical shape is set as an extraction area, and point data in the entire perimeter point cloud data belonging to the extraction area is extracted as target point cloud data.

Thus, it is possible to easily and automatically extract analysis-target point cloud data as to a structure as an analysis target from the point cloud data as to the measurement route acquired over the entire perimeter of the measurement device.

Also, according to the point cloud data extraction method described in claim 2, the locus point string for determining an extraction area is acquired by acquiring locus points spaced at a constant distance designated from measurement locus point string data acquired at constant time intervals defined in advance.

Thus, setting many locus point strings to excess is prevented, and an outflow area setting process and the point cloud data extraction process can be easily and quickly performed.

Also, according to the point cloud data extraction method described in claim 3, the measurement route is set as a traveling route on a road as a measurement target, the analysis target is set as a road surface of the road and, furthermore, the extraction area is set as a plurality of columnar areas set at positions defined in advance on a vertical line from the locus points and the columnar areas are set to each have a diameter set in advance and a height dimension set in advance.

Thus, point cloud data as to the road surface having a desired width dimension can be quickly extracted with less dropouts.

Also, according to the point cloud data extraction method described in claim 4, the extraction area includes a plurality of columnar areas and inner areas of a plurality of parallelepiped areas.

Thus, point cloud data which is supposed to be excluded from a columnar area as point cloud data of the road can be extracted in the inner area of a parallelepiped area, and extraction dropouts of point cloud data can be minimized.

And, according to the point cloud data extraction method described in claim 5, a determination as to whether the entire perimeter point cloud data belongs to the extraction area is made by Approximate Nearest Neighbor (ANN) and a determination as to inside or outside of a region specified by a designated geometrical shape.

Thus, the point cloud data extraction process can be simply performed at high speed without using a high-performance device.

BRIEF DESCRIPTION OF DRAWINGS

FIG. 2 is a schematic diagram depicting a road surface measurement state by a road surface measurement device, in which

FIG. 3 is to describe an extraction area for performing extraction of point cloud data, in which

FIG. 6 depicts an extraction state of point cloud data, in which

DESCRIPTION OF EMBODIMENTS

A point cloud data extraction method and a point cloud data extraction device according to an embodiment to implement the present invention are described.

The point cloud data extraction method and the point cloud data extraction device according to the embodiment of the present invention extracts entire perimeter point cloud data acquired by a road surface measurement device configuring an MMS (Mobile Mapping System) and point cloud data of a road as an analysis target from a locus point string data. The extracted point cloud data of the road is evaluated as a plane, and an evaluation of road surface properties is performed.

The road surface measurement device is mounted on a vehicle moving by traveling, and acquires high-precision actual measurement data by a scanner and images. This measurement is performed on the entire perimeter of the scanner, and point cloud data (entire perimeter point cloud data) about a road and also its peripheral structures such as attachments on the road, architecture, and timber. When the road is evaluated, if point cloud data acquired for things other than the road is present, setting a model surface of the road and so forth cannot be accurately performed. Thus, by the extraction device, point cloud data of the road is extracted from the acquired entire perimeter point cloud data as target point cloud data.

Figure 1:
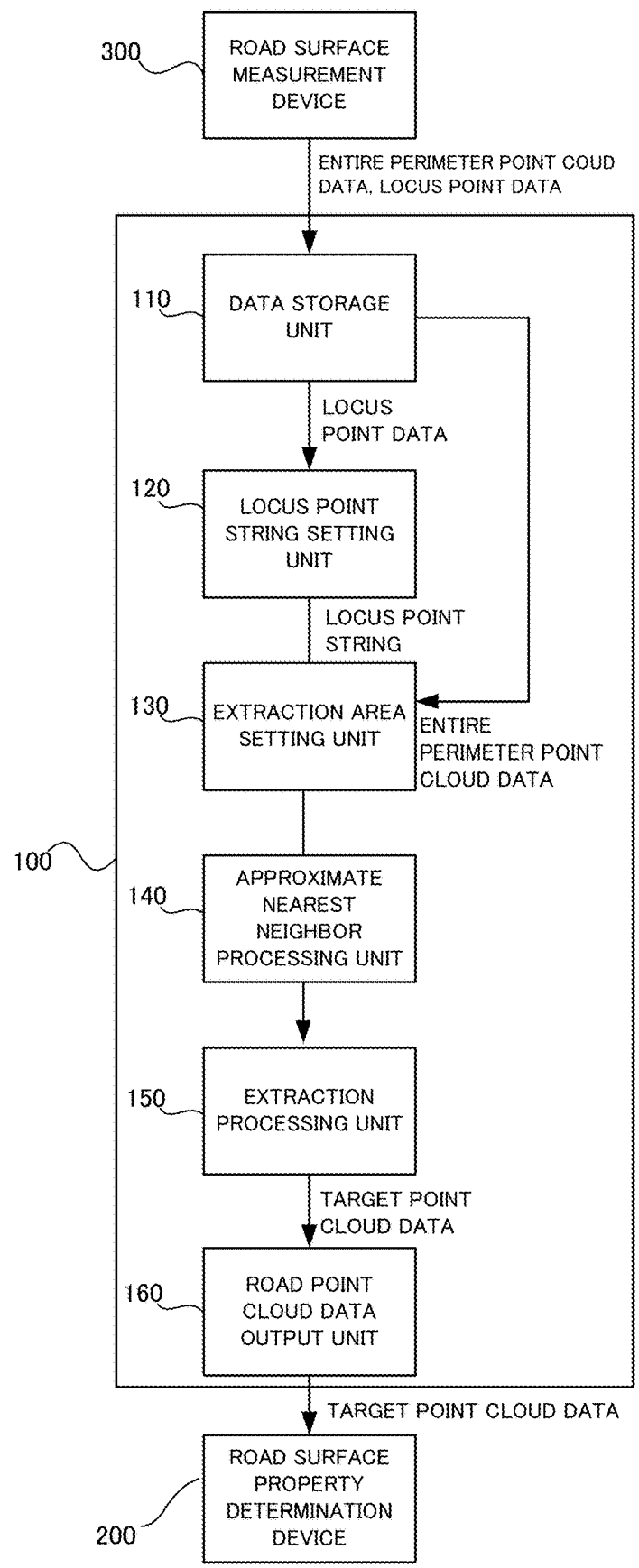
FIG. 1 is a block diagram depicting the structure of a point cloud data extraction device according to an embodiment of the present invention.
Figure 2A:
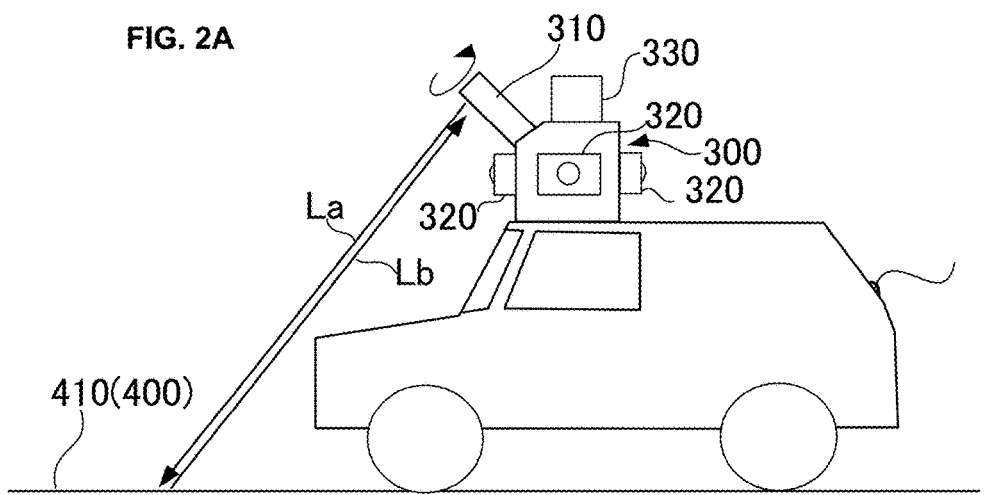
FIG. 2A is a side view and FIG. 2B is a plan view.
Figure 2B:
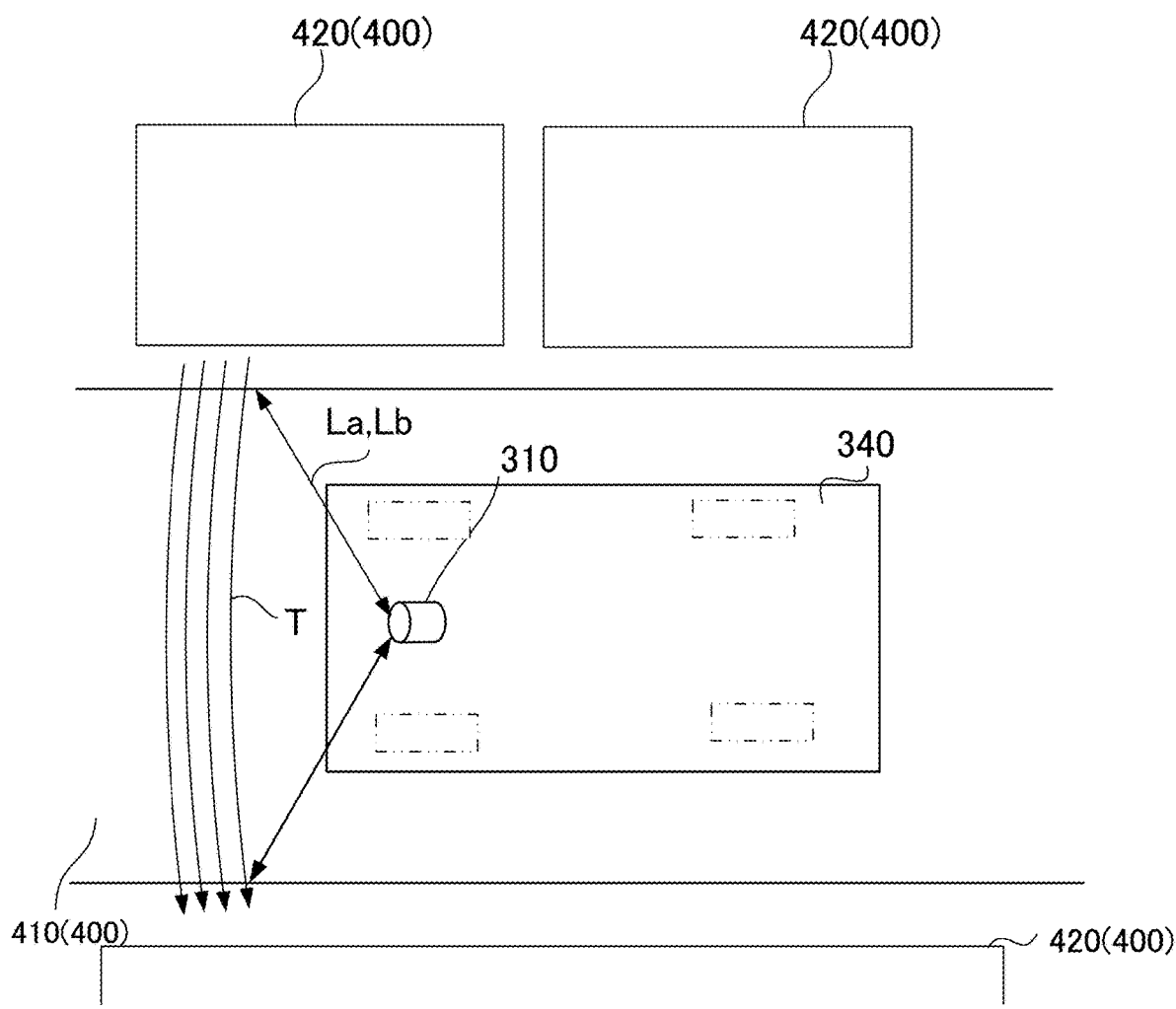

In the following, a point cloud data extraction device is described. FIG. 1 is a block diagram depicting the structure of the point cloud data extraction device according to the embodiment of the present invention, and FIG. 2 is a schematic diagram depicting a road surface measurement state by the road surface measurement device, in which (a) is a side view and (b) is a plan view. A road surface measurement device 300 is mounted on a vehicle 340 traveling a road 410, as depicted in FIG. 2(*a*). The road surface measurement device 300 includes a scanner 310 as a measurement device, entire perimeter cameras 320, a GNSS (Global Navigation Satellite System) device 330, and an orientation detection device, accelerometer, and so forth of the road surface measurement device 300. The road surface measurement device 300 spirally applies scanning light La diagonally forward of the vehicle 340 by the scanner 310 while acquiring a position by the GNSS device to receive reflected light Lb from a structure 400, for example, the road 410 or a peripheral architecture 420.

Based on a time until this reception, measurement data (entire perimeter point cloud data) of the structure 400 is acquired. Thus, a locus T of scanning light La in the structure 400 is in a spiral shape. Note that only the scanning light La applied to the road 410 is depicted in FIG. 2(*b*). In the scanner 310, 32 measurement elements are arranged. These measurement elements include light-emitting elements and light-receiving elements. From the light-emitting elements, measurement light are emitted in a pulse shape. The light-receiving elements receives reflection of the measurement light by the structure 400. Based on a time from light emission to light reception, entire perimeter point cloud data measured over the entire perimeter of the scanner 310 is acquired.

Also, the road surface measurement device 300 simultaneously acquires images of the road over the entire perimeter by the entire perimeter cameras 320. The GNSS device 330 catches electric radio waves from an artificial satellite, and acquires a plan position and an altitude of the road surface measurement device 300 to acquire a traveling route, that is, a measurement route, of the road surface measurement device 300. Then, the coordinates of the road surface measurement device 300 are acquired at constant time intervals, for example, locus points at intervals of 100 times per second, are acquired, and locus point string data is outputted as coordinates. Since this locus point string data is acquired at the predetermined time intervals, spacing between pieces of data is not necessarily a constant distance, and spacing between pieces of data depends on the traveling speed of the vehicle 340.

An extraction device 100 acquires entire perimeter cloud data and locus point data as measurement data from the road surface measurement device 300, and extracts point cloud data as to the road as target point cloud data for output to a road surface evaluation device 200. In the road surface evaluation device 200, this target point cloud data is analyzed to evaluate road surface properties.

As depicted in FIG. 1, the extraction device 100 includes a data storage unit 110, a locus point string setting unit 120, an extraction area setting unit 130, an approximate nearest neighbor processing unit 140, an extraction processing unit 150, and a road point cloud data output unit 160.

The extraction device 100 is configured of a computer including a CPU (Central Processing Unit) as a processing device, a RAM (Random Access Memory) as a main storage device, a ROM (Read Only Memory), and a HDD (Hard Disc Drive) as an auxiliary storage device, and so forth. With a program executed by the CPU, the functions of the data storage unit 110, the locus point string setting unit 120, the extraction area setting unit 130, the approximate nearest neighbor processing unit 140, the extraction processing unit 150, and the road point cloud data output unit 160 are implemented. The extraction device 100 can be implemented by a notebook-type personal computer having a program for implementing a point cloud data extraction method installed therein.

The data storage unit 110 receives and stores the entire perimeter point cloud data and the locus point string data from the road surface measurement device 300. The locus point string setting unit 120 acquires the locus point string data from the data storage unit 110, converts point string data acquired at constant intervals to generate a locus point string with locus points arrayed with predetermined constant spacing (for example, 30 cm). This process can be performed by, for example, acquiring points spaced with a constant distance designated from the measured locus point string data. Note that the spacing of the point string can be changed as appropriate in accordance with the measurement target or the like.

The extraction area setting unit 130 sets a plurality of areas positionally defined with reference to the locus points of the locus point string set at the locus point string setting unit 120 and specified by a designated geometrical shape. In the present embodiment, point cloud data as to a road is acquired. Thus, an area for extraction of point cloud data is set as follows. FIG. 3 is to describe an extraction area for performing extraction of point cloud data, in which (a) is a plan view of columnar areas and (b) is a plan view of columnar areas and parallelepiped areas, and FIG. 4 is a perspective view depicting columnar areas and parallelepiped areas configuring an extraction area for performing extraction of point cloud data.

Figure 3A:
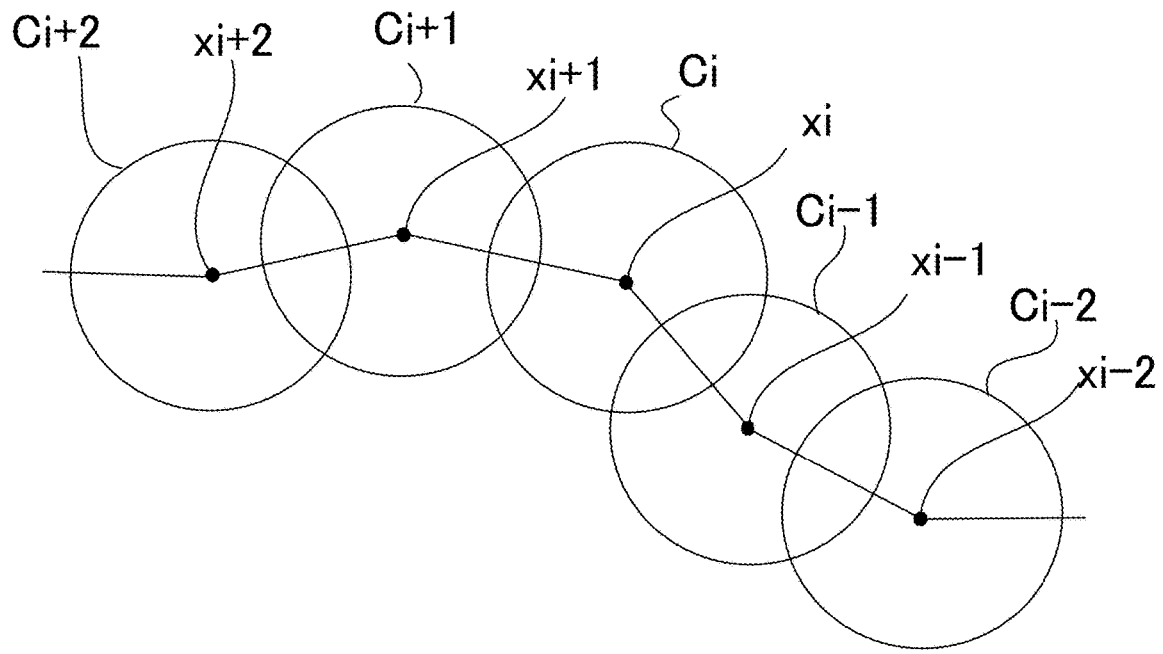
FIG. 3A is a plan view of columnar areas and FIG. 3B is a plan view of columnar areas and parallelepiped areas.
Figure 3B:
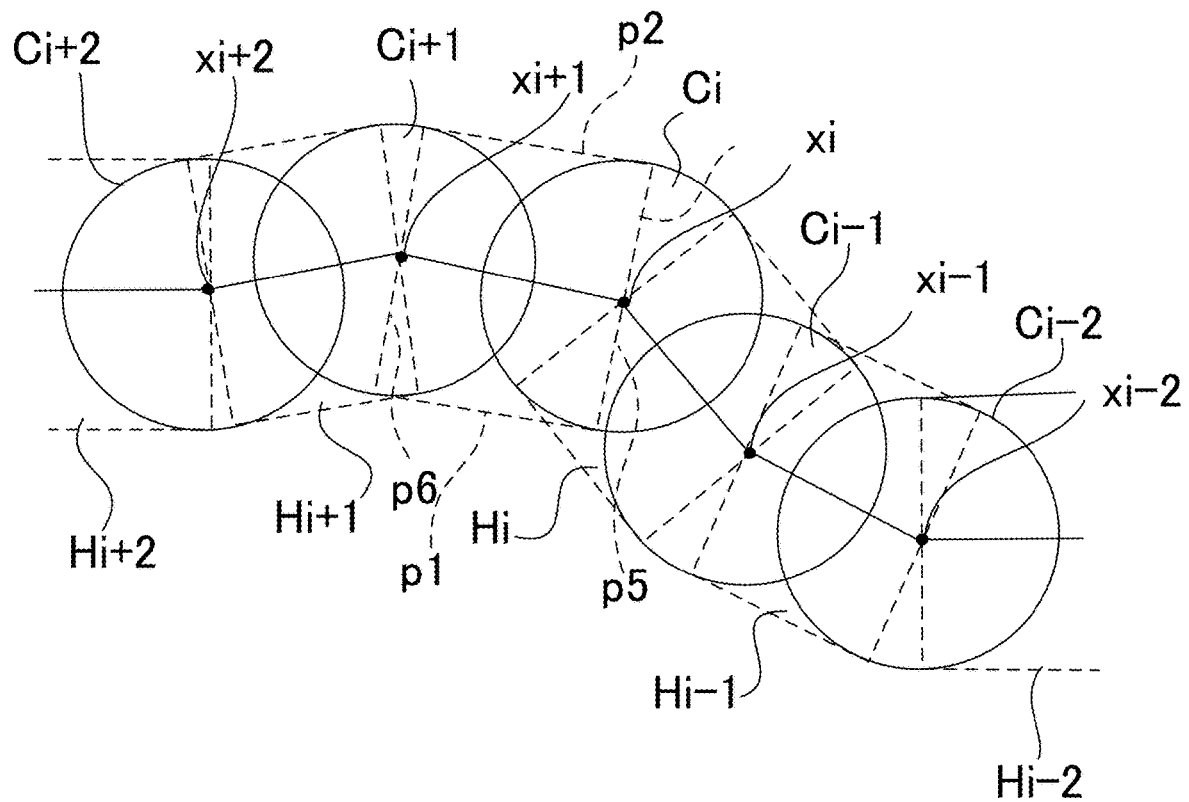
Figure 4:
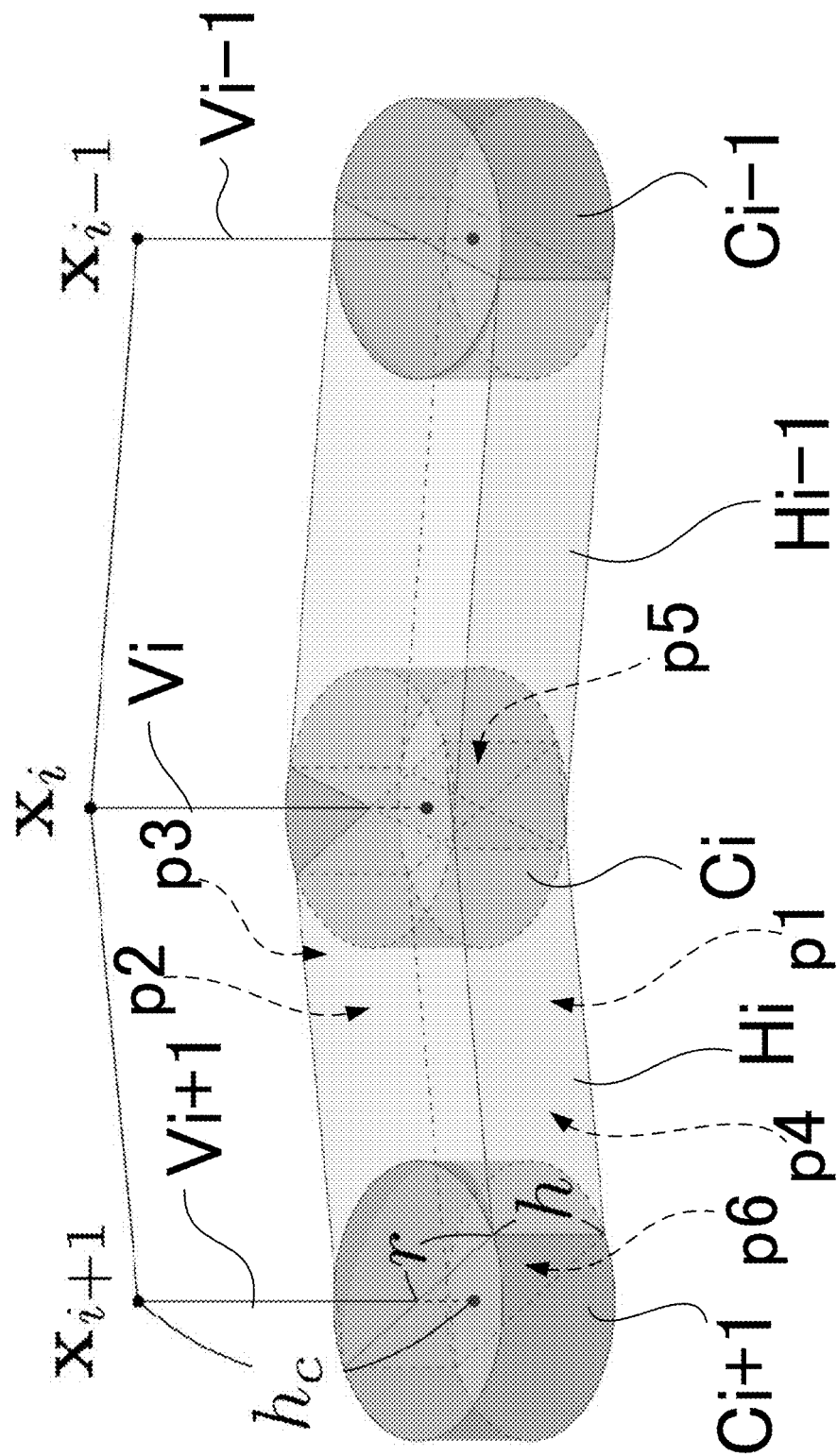
FIG. 4 is a perspective view depicting columnar areas and parallelepiped areas configuring an extraction area for performing extraction of point cloud data.

The extraction area setting unit 130 sets, as depicted in FIGS. 3(a) and (b) and FIG. 4, a columnar area Ci at a position defined in advance on a vertical line Vi from each locus point Xi to the ground, that is, having a radius r (for example, 3 m) set in advance and a height dimension h (for example, 20 cm) set in advance that are set from a locus point at a predetermined distance hc.

Also, in the present embodiment, when attention is focused on adjacent two columnar areas Ci and Ci+1, the extraction area setting unit 130 sets a parallelepiped area Hi surrounded by two parallel tangent planes p1 and p2 circumscribing the outer circumferential plane of each of the two columnar areas, an upper plane p3 corresponding to upper planes of the two columnar areas, a bottom plane p4 corresponding to bottom planes of the two columnar areas, and diameter planes p5 and p6 including two generatrixes where the two tangent planes are in contact with the outer circumferential plane in each of the two columnar areas and forming the diameters of the columnar areas. In this example, a parallelepiped area Hi−1 and a parallelepiped area Hi are arranged on both sides of the columnar area Ci. These settings are performed from a keyboard and/or mouse of a notebook-type personal computer for use as the extraction device 100. The shape, dimensions, and position of this area can be changed as appropriate in accordance with the target to be extracted.

The approximate nearest neighbor processing unit 140 performs a process of determining to which locus point string each point of the entire perimeter point cloud data stored in the data storage unit 110 is the nearest. In this process, for example, Approximate Nearest Neighbor (ANN) can be used. Note that another scheme can be used for this process.

The extraction processing unit 150 extracts point cloud data arranged in the area defined at the extraction area setting unit 130 from the entire perimeter point cloud data, and outputs this point cloud data as target point cloud data. The road point cloud data output unit 160 outputs the target point cloud data extracted at the extraction processing unit 150 to the road surface evaluation device 200.

Figure 5:
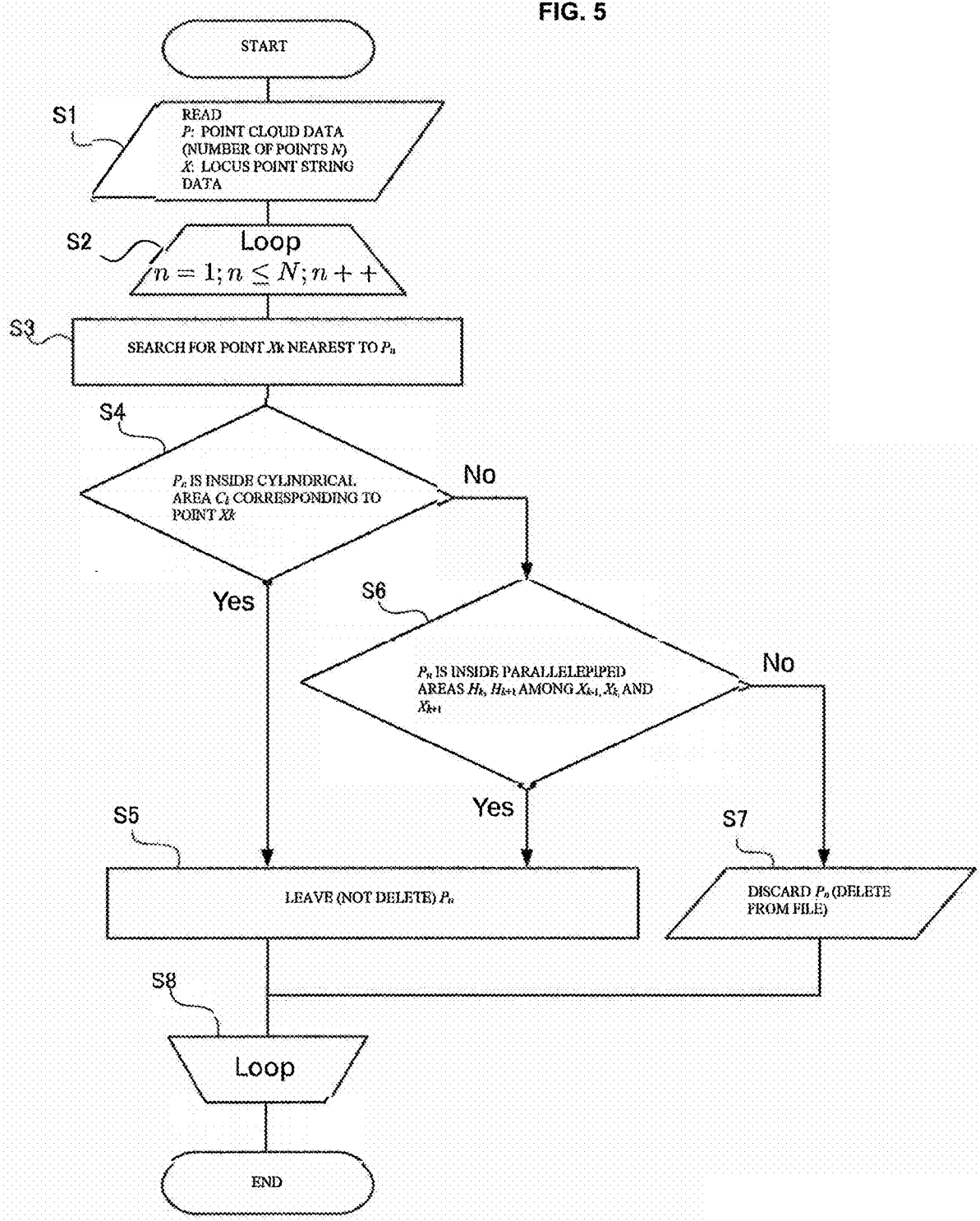
FIG. 5 is a flowchart depicting a process in a point cloud data extraction method according to the embodiment.

Next, the process by the extraction area setting unit 130 and the extraction processing unit 150 is described. FIG. 5 is a flowchart depicting a process in a point cloud data extraction method according to the embodiment. First, the approximate nearest neighbor processing unit 140 reads N pieces of point cloud data (P) from the data storage unit 110 for storage in a file for point cloud data storage, and reads locus point string data (X) generated at the locus point string setting unit 120 (step S1). The following process is repeatedly performed on conditions that n=1; n≤N; and n++ (step S2 to step S8).

That is, firstly, a search is made for a locus point Xk of a locus point string that is the nearest to a point Pn of the point cloud data (step S3). This is performed with Approximate Nearest Neighbor (ANN). This method has been known, and its source code has also been published. With this, a correspondence is established, indicating to which locus point Xk the point Pn belongs. Note that when the distances between the point Pn and the two locus points Xk and Xk+1 are equal, there is no harm in performing the process by assuming that the point belongs to one or both.

Then, from this result, it is determined whether the point Pn is inside the columnar area Ck corresponding to the locus point Xk (step S4). When the point Pn is inside the columnar area Ck (Yes at step S4), the point Pn is not deleted and left (step S5). On the other hand, when the point Pn is outside the columnar area Ck (No at step S4), it is determined whether the point Pn is inside corresponding parallelepiped areas Hk and Hk−1 among Xk−, Xk, and Xk+1 (step S5). When the point Pn is inside the parallelepiped areas Hk and Hk−1 (Yes at step S5), the point Pn is not deleted and left in the file storing the point cloud data (step S5). On the other hand, when the point Pn is not inside the parallelepiped areas Hk and Hk−1 (No at step S5), the point Pn is discarded and deleted from the file (step S7). With these processes, the point cloud data present in the set area can be extracted as target point cloud data.

Next, a specific example of a process by the extraction device 100 is described. FIG. 6 depicts an extraction state of point cloud data, in which (a) is a diagram depicting is a diagram with an acquired photograph superposed on point cloud data before extraction, (b) is a diagram with extracted point cloud data of a road superposed on a photograph, and (c) is an enlarged diagram of the extracted point cloud data of the road.

Figure 6A:
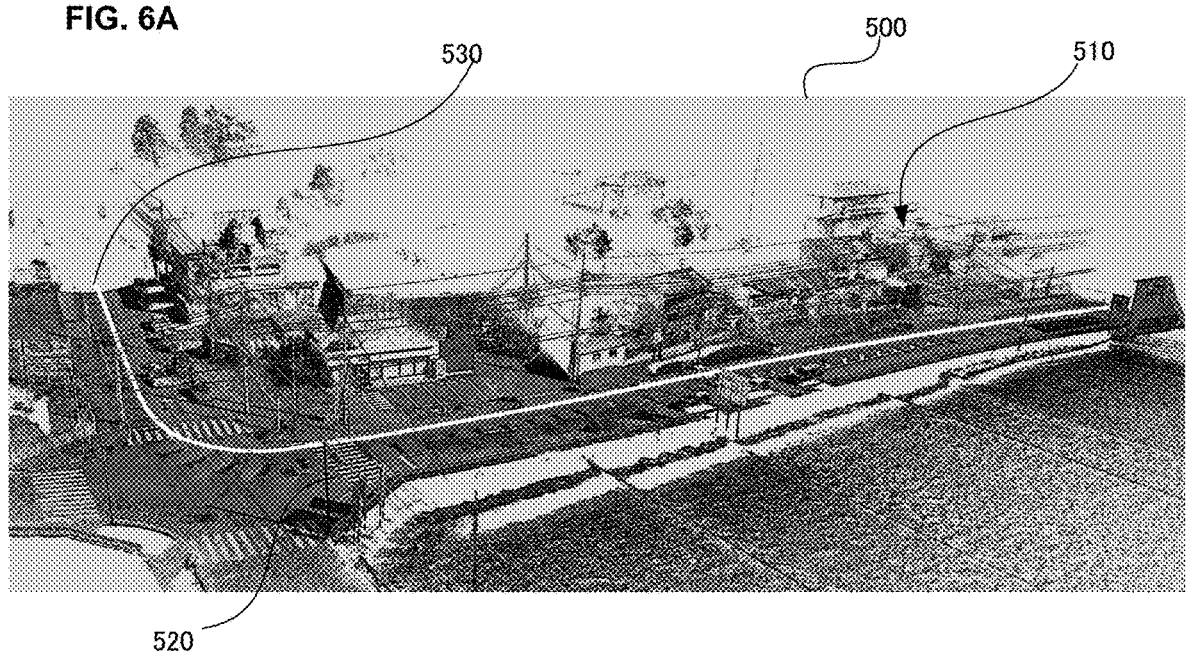
FIG. 6A is a diagram with an acquired photograph superposed on point cloud data before extraction.
Figure 6B:
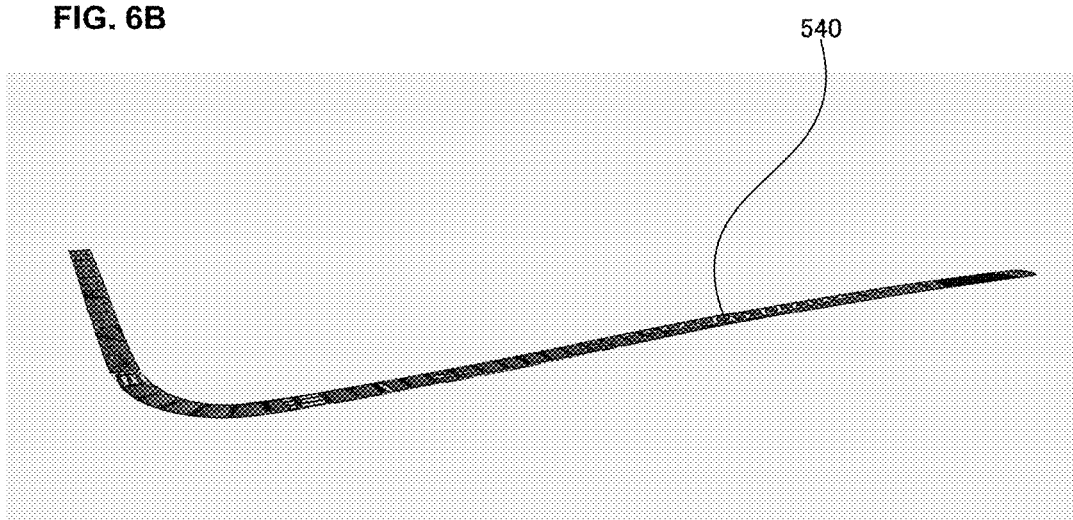
FIG. 6B is a diagram with extracted point cloud data of a road superposed on a photograph.
Figure 6C:
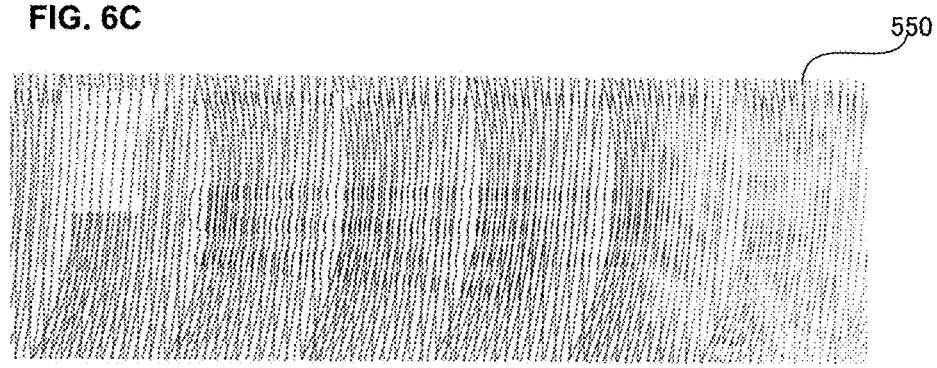
FIG. 6C is an enlarged diagram of the extracted point cloud data of the road.

An image 500 depicted in FIG. 6(a) depicts data read from the road surface measurement device 300 as a bird's-eye view. The image 500 represents a road 510, building 520, and so forth together. This image 500 is acquired by superposing photograph data acquired at the entire perimeter cameras 320 on the entire perimeter point cloud data acquired at the scanner 310 and superposing a locus point string 530 thereon for conversion into a bird's-eye view.

By processing the entire perimeter point cloud data indicated by this image 500 at the extraction device 100, point cloud data only as to the road 510 was acquired as target point cloud data. An image 540 represents the extracted point cloud data by, as with FIG. 5(a), superposing photographic data for display as a bird's-eye view. With this, it can be found that the point cloud data of the road can be acquired as target point cloud data. The point cloud data of the road is schematically depicted in FIG. 5(c). In this image 550, point cloud data extracted in the extraction area is arranged over the width of the road. Note that point clouds are distributed in an arc shape along the scanning locus of the scanner 310.

The acquired target point cloud data is evaluated at the road surface evaluation device 200. That is, at the road surface evaluation device 200, the target point cloud data from the extraction device 100 is cut into predetermined small areas, plane fitting is performed on point cloud data in each small area to generate a reference plane, and a space amount at each point from the reference plane is calculated. Then, this space amount is visualized or converted into a numerical form to evaluate the measured road. This evaluation scheme has been known.

Note in the above-described embodiment that a road is taken as an evaluation target and an extraction area is specified by a columnar area and a parallelepiped area. However, the extraction area can be changed as required. For example, the extraction area can be configured only by columnar areas. Also, to measure an architecture or slope positioned outside a road, an area set from a locus point string toward the outside of the road can be taken. Furthermore, when a side surface or ceiling surface of a tunnel is taken as a measurement target, an area interposed between two columns having a common center and different radiuses can be taken as an extraction area.

REFERENCE SIGNS LIST

100: extraction device
110: data storage unit

120: locus point string setting unit
130: extraction area setting unit
140: approximate nearest neighbor processing unit
150: extraction processing unit
160: road point cloud data output unit
200: road surface evaluation device
300: road surface measurement device
310: scanner
320: entire perimeter camera
330: GNSS device
340: vehicle
400: structure
410: road
420: architecture
500: image
510: road
520: building
530: locus point string
540: image
550: point cloud image

The invention claimed is:

1. A point cloud data extraction method of extracting target point cloud data as point cloud data as to a specific analysis target from entire perimeter point cloud data acquired by moving a measurement device along a measurement route and scanning a perimeter of the measurement device, the method comprising:
acquiring locus point string data representing a locus of movement of the measurement device on the measurement route as a plurality of locus points;
setting, as an extraction area, an area positionally defined with reference to each of the locus points of a locus point string acquired from the locus point string data and specified by a designated geometrical shape; and
extracting, as target point cloud data, point data in the entire perimeter point cloud data belonging to the extraction area.

2. The point cloud data extraction method of claim 1, wherein
the locus point string is acquired by acquiring locus points spaced at a constant distance designated from measurement locus point string data acquired at constant time intervals defined in advance.

3. The point cloud data extraction method of claim 1, wherein
the measurement route is a traveling route on a road as a measurement target,
the specific analysis target is a road surface of the road, and
the extraction area is a plurality of columnar areas set at positions defined in advance on a vertical line from the locus points and the columnar areas each have set thereto a diameter set in advance and a height dimension set in advance.

4. The point cloud data extraction method of claim 2, wherein
the extraction area includes
a plurality of columnar areas, and
an inner area of a parallelepiped area surrounded by, when attention is focused on two adjacent columnar areas of the plurality of columnar areas, two parallel tangent planes circumscribing an outer circumferential plane of each of the two adjacent columnar areas, an upper plane corresponding to upper planes of the two adjacent columnar areas, a bottom plane corresponding to bottom planes of the two adjacent columnar areas, and diameter planes including two generatrixes where the two parallel tangent planes are in contact with the outer circumferential plane in each of the two adjacent columnar areas and forming diameters of the two adjacent columnar areas.

5. The point cloud data extraction method of claim 1, wherein
a determination as to whether the entire perimeter point cloud data belongs to the extraction area is made by Approximate Nearest Neighbor (ANN) and a determination as to inside or outside of a region specified by the designated geometrical shape.

6. A point cloud data extraction device for extracting target point cloud data as point cloud data as to a specific analysis target from entire perimeter point cloud data acquired by moving a measurement device along a measurement route and scanning a perimeter of the measurement device, the point cloud data extraction device comprising:
means for acquiring locus point string data representing a locus of movement of the measurement device on the measurement route as a plurality of locus points;
means for setting, as an extraction area, an area positionally defined with reference to each of the locus points and specified by a designated geometrical shape; and
means for extracting, as target point cloud data, point data in the entire perimeter point cloud data belonging to the extraction area.

* * * * *